(No Model.)

J. HOBBS.
APPARATUS FOR TREATING ARTIFICIAL BUTTER, &c.

No. 271,241. Patented Jan. 30, 1883.

Attest
Wm. H. Sonneborn
John M. O'Brien

Inventor
John Hobbs
By his atty.
John R. Bennett

UNITED STATES PATENT OFFICE.

JOHN HOBBS, OF BOSTON, MASSACHUSETTS.

APPARATUS FOR TREATING ARTIFICIAL BUTTER, &c.

SPECIFICATION forming part of Letters Patent No. 271,241, dated January 30, 1883.

Application filed December 12, 1882. (No model.)

*To all whom it may concern:*

Be it known that I, JOHN HOBBS, of the city of Boston, in the county of Suffolk and State of Massachusetts, have invented an Improvement in Apparatus for Treating Artificial Butter and for other Purposes, of which the following is a specification.

My invention has reference to cooling apparatus in general, but more particularly to that class in which the object or substance to be cooled is placed in the cooling-liquid; and it consists in a tank divided into two compartments, both of which contain the cooling-liquid, which is free to flow from one compartment to the other, and one of which compartments is adapted to contain ice, the substance or article to be cooled being placed in compartment free from ice, and in details of construction, all of which are more fully set forth in the following specification, and referred to in the accompanying drawings, which form part thereof.

The object of my invention is to give a clear cooling body of water or other liquid into which the substance to be cooled is placed, whereby said substance shall not come into contact with ice. This is particularly advantageous when the substance to be cooled is an emulsion, as in the case of the manufacture of oleomargarine-butter, in which the emulsion is discharged directly into the cold water, causing it to solidify without becoming mixed with broken ice, as was heretofore the case. By means of a cooler constructed after my invention the ice is never wasted, and is never in the way while handling the articles or substance to be cooled, and which in some processes is very important.

Figure 1:
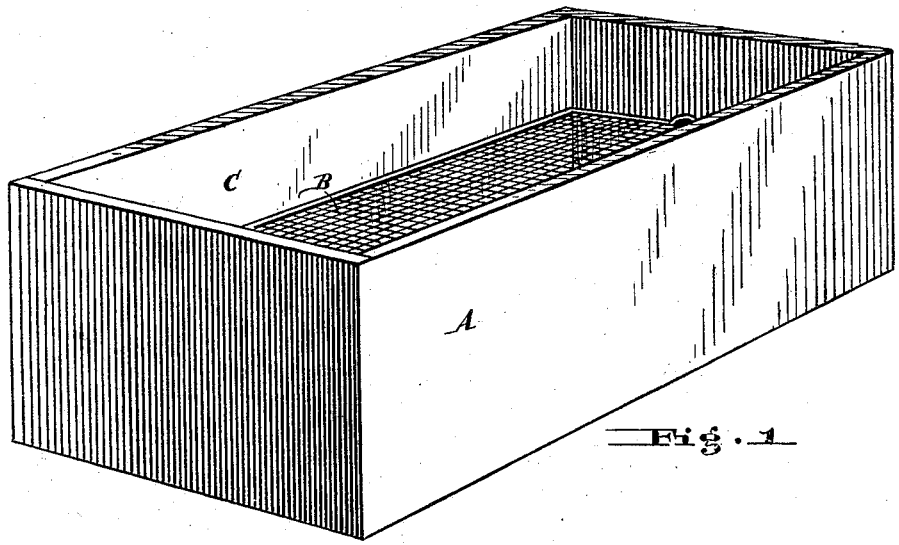
Figure 2:
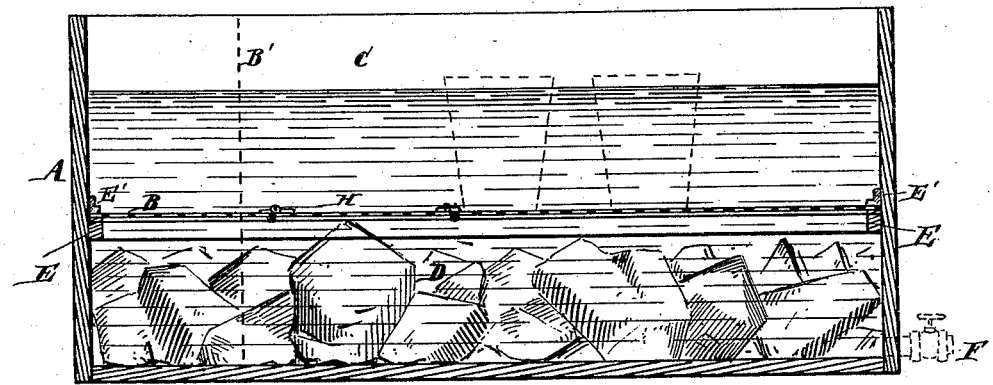

In the drawings, Figure 1 is a perspective view of a cooler embodying my invention, and Fig. 2 is a longitudinal sectional elevation of same.

A is the tank, and B is a wire or other screen, as perforated metal or wood, or wooden bars, which is so arranged within said tank A as to form it into two or more compartments, C D.

The screen or open division B may be supported upon ribs or flanges E on the sides of the tank, and, if desired, may be kept down by pieces E', or their equivalent, which are secured to the tank above said division B. If this division be made of heavy iron, it will be sufficient of its own weight to keep the ice in the chamber D down, but if of very light perforated sheet-iron, gauze, or wood it will be necessary to use the pieces E', or their equivalent. This division B is made removable, or a portion of it may be hinged, for the insertion of ice. When nearly filled with water the compartment D will contain the ice and compartment C clear water, into which the substance to be cooled is placed.

If desired, the division B may be arranged vertically, as shown at B; or there may be two ice-compartments and one water-compartment, or vice versa.

Having now described my invention, what I claim as new, and desire to secure by Letters Patent, is—

1. A cooler which consists of a tank having two or more compartments, one or more of which are adapted to contain ice, and one or more of which contain only clear water, said water being free to flow from one compartment to another, substantially as and for the purpose specified.

2. A cooler which consists of a tank divided into two or more compartments by grating, screen, or their equivalent, said grating being adapted to separate the ice from one or more of said compartments without impeding the passage of the water, substantially as and for the purpose specified.

3. In a cooler, the combination of the tank, screen, or grating, and means to hold said screen or grating in position in said tank, substantially as and for the purpose specified.

In witness whereof I have hereunto set my hand.

JOHN HOBBS.

Witnesses:
WM. B. H. DOWSE,
JAS. A. MCGEOUGH.